Nov. 9, 1943.　　　W. K. MATHESON　　　2,333,805
VALVE
Filed July 17, 1940　　　2 Sheets-Sheet 2
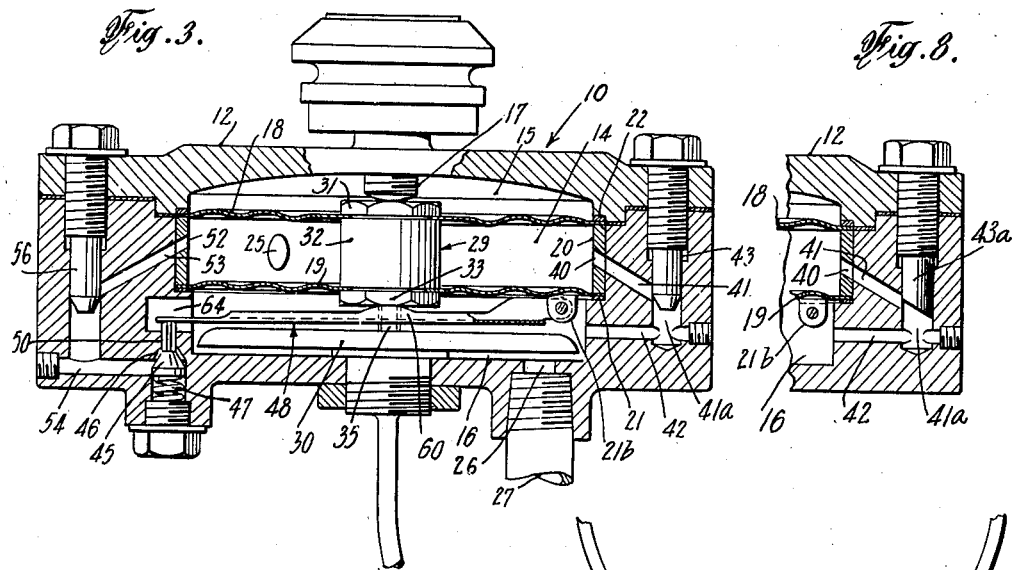
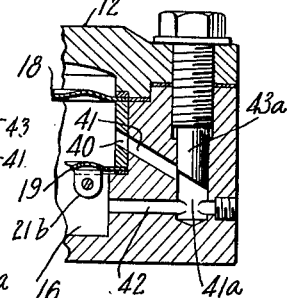
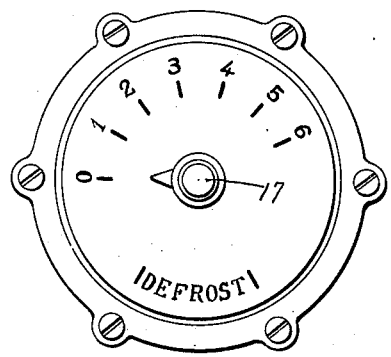
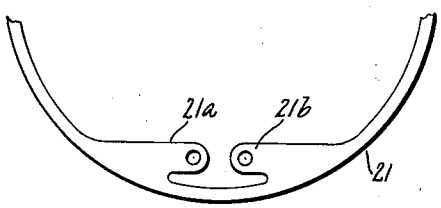
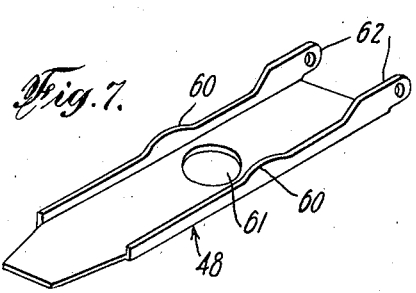
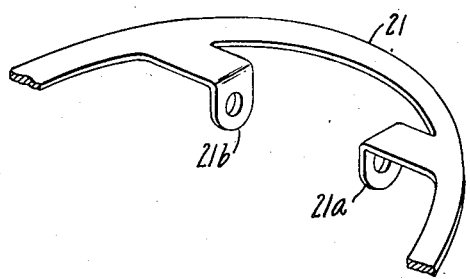
INVENTOR
WILLIAM K. MATHESON
BY
Andrew G. Hubbard
ATTORNEY Patented Nov. 9, 1943

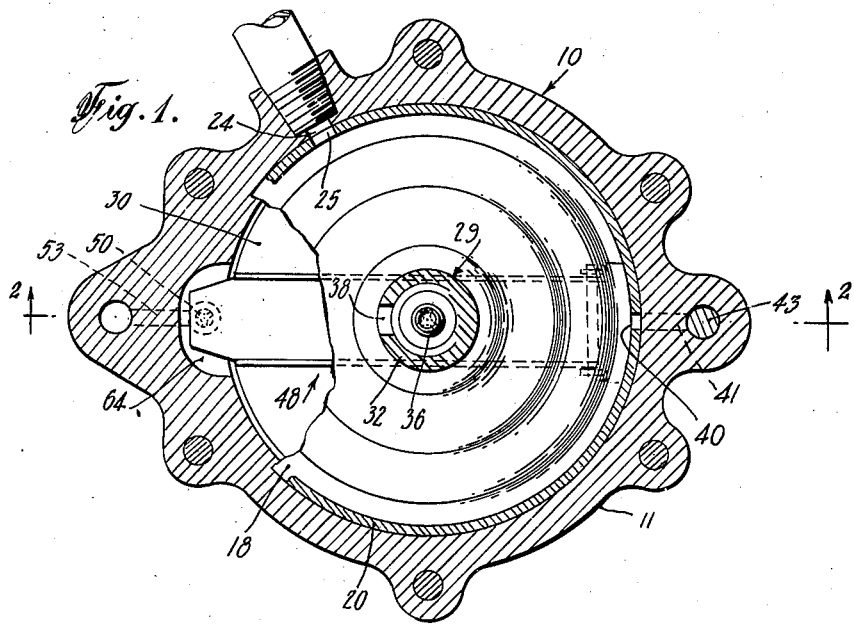
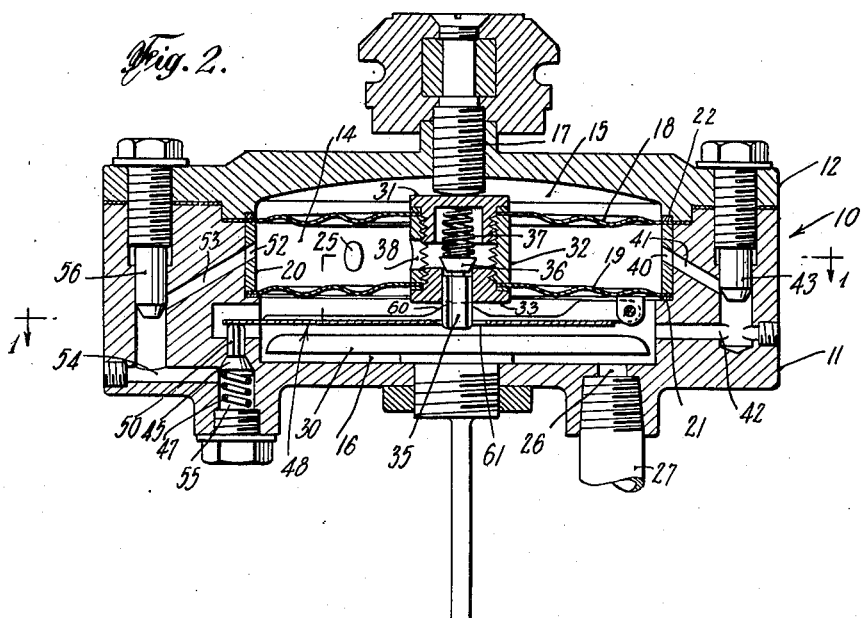

2,333,805

UNITED STATES PATENT OFFICE 2,333,805

VALVE

William K. Matheson, Brooklyn, N. Y., assignor to H & H Thermostats, Inc., New York, N. Y., a corporation of New York Application July 17, 1940, Serial No. 345,929

11 Claims. (Cl. 137—144)

This invention relates to improvements in valves.

It is an object of the invention to provide improved valve means of the type wherein the flow of fluid through the valve is controlled by external conditions, such as temperature or pressure at a remote point.

It is an object of the invention to provide valve means of the class described, wherein the valve setting may be repeated; that is to say, the operation of the valve at each of its setting points may be predicted with a relatively high degree of accuracy.

It is an object of the invention to provide an improved valve embodying means for the control of fluid flow according to a temperature or pressure condition at a location remote from the valve, and including secondary means effective to permit flow through the valve at a valve setting wherein the principal control is in closed status.

The present invention is particularly applicable to automatic valves in which flow through the valve is a function of the extent of expansion of a temperature- or pressure-sensitive bellows in operative association with the stem of a poppet valve or equivalent, the relative position of the valve stem with respect to the bellows determining the instants of operation of the valve.

Such valves are, per se, old in the art. It is a feature of the present invention, however, that the valve means are displaceable as a unit, with respect to the bellows, such movement being always in a path which is substantially precisely axial of the bellows. This uniformity of movement insures a uniform contact of the bellows with the valve stem for each movement of the bellows and hence a predictable degree of opening of the valve under conditions of known expansion of the bellows and proximity of the valve stem thereto. A dial or like index for setting the valve may be graduated with assurance of a definite and repeatable valve opening at each dial setting.

Pursuant to this objective, the valve operator means is mounted between spaced, flexible diaphragms arranged within the body cavity of the valve in parallelism. The spaced diaphragms are arranged to function as a fluid inlet chamber, at the center of which is placed the valve operator means. The flexing of the diaphragms, as by the operation of an adjusting screw or equivalent, results in the movement of the valve operator means toward or away from the bellows in a path normal to the planes of the diaphragms. With the diaphragms mounted in a parallel and concentric relation to the bellows, it follows that the line of movement of the valve means will be axial of the bellows and normal to the plane thereof.

Other features and advantages will hereinafter appear.

In the accompanying drawings:

Fig. 1 is a plan section of a valve constructed pursuant to the present invention, the section being taken on lines 1—1 of Fig. 2;

Fig. 2 is an elevation, in section on lines 2—2 of Fig. 1, of a valve embodying the invention;

Fig. 3 is an elevation similar to that of Fig. 2, illustrating a phase of operation of the secondary flow control means;

Fig. 4 illustrates a typical valve-setting dial;

Fig. 5 is a plan view of the secondary flow control lever mount in a preliminary stage of formation;

Fig. 6 is an enlarged perspective of a portion of the flow control lever mount;

Fig. 7 is an enlarged perspective of the secondary flow control lever; and

Fig. 8 shows a second form of gas-flow adjustment screw.

Referring to the drawings for a more detailed description of the invention: 10 designates the valve considered as an entirety; the body of the valve includes a base portion 11 and a cover 12 therefor, each desirably of die-cast metal or equivalent, suitably configurated and secured with such gaskets and fastening means as are required to provide an interior, fluid-tight, body cavity.

An inlet chamber 14 is disposed within the body cavity, and sub-divides the same into an upper portion 15 and an outlet chamber 16. As later appears, the upper portion 15 of the valve body is sealed with respect to inlet chamber 14, and hence is sealed against the entry of fluid; valve setting screw 17, which passes through cover 12 into said upper portion 15, may have a relatively coarse thread without danger of leakage of fluid about the thread.

It is a feature of the invention that the inlet chamber 14 is moveable under the action of screw 17, and advantage is taken of such movement to establish the conditions of flow through the valve.

The inlet chamber, in a preferred form of the invention, comprises spring metal diaphragms 18, 19, preferably in combination with a metal ring 20, which affords an accurate, positive means for maintaining the diaphragms in parallellism. Ring 20 is in snug engagement with the side wall of the body cavity. As appears in Fig.

2, diaphragm 18 has a greater diameter than the ring 20, and accordingly extends beyond the limits of the ring to lie in contact with a suitable surface formed in the base 11 of the body. Such extension of the upper diaphragm and the employment of a suitable gasket 22 effectively seals upper portion 15 of the body cavity against entry of fluid. A lower gasket 21 precludes leakage into the outlet chamber 16.

Fluid inflow is through a passage 24 in the side wall of base 11, said passage registering with an aperture 25 in the wall of ring 20. At any convenient location within the outlet chamber 16, I provide a passage 26 and a therewith registering outlet connection 27.

The principal operating control of fluid flow is afforded, in the embodiment illustrated, by valve means of the lift, or "mushroom" type, in association with suitable actuator means operating upon the valve stem to displace the valve disc with respect to its seat. The valve actuator means may be an expansible bellows of the conventional fluid expansion or pressure types, suitably secured within the outlet chamber 16 concentrically therewith, and having a capillary tube connection with the apparatus of which the temperature or pressure is to exert primary influence over the operation of the valve.

The valve means, designated in its entirety by numeral 29, is mounted within the chamber 14 by securement to the upper and lower diaphragms 18, 19, at the centers thereof. Inlet chamber 14 and outlet chamber 16 being concentric, valve 29 must be concentric with the valve actuator, or bellows, 30. Valve 29 includes a cap 31, barrel 32, and base 33, said cap and base passing through apertures at the centers of the stated diaphragms. The cap and base members are threaded for cooperation with female threading in barrel 32, and may thereby be secured to the diaphragms. Suitable gaskets insure the free flexing of the diaphragms without leakage at the areas of engagement of cap 31 and base 33 therewith. Preferably, the diaphragms 18, 19, are biased upwardly, whereupon the cap 31 is urged toward screw 17. Right hand rotation of the screw 17 flexes the inlet chamber downwardly, and moves valve 29 closer to the bellows 30; when the screw is backed off, the diaphragms 18, 19, react upwardly to move valve 29 away from bellows 30.

With the valve 29 secured centrally of the diaphragms 18, 19, and with the planes of the diaphragms being in parallelism, the displacement of valve 29 during the flexing of the diaphragms is substantially without deviation from a precise axial line.

Base 33 of valve 29 is bored at its center, to slidably accommodate a grooved valve stem 35. The upper surface of base 33 affords a seat for valve disc 36, said disc being yieldably held against the seat by means such as the coil spring 37. A passage 38 in the barrel 32 communicates with inlet chamber 14.

The preferably rounded tip of valve stem 35 is disposed centrally with respect to the bellows 30. At all stages of adjustment of screw 17 and resultant position of valve 29, the stem 35 is substantially precisely centered with respect to the bellows 30.

From the foregoing, it is seen that the diaphragms 18, 19, serve a triple function; they form, with ring 20, a flexible inlet chamber; they operate in lieu of spring means to maintain the valve mount cap in engagement with adjustment screw 17; and they insure that the movement of valve 29 and the stem 35 thereof is substantially without deviation from a path which is axial with respect to the bellows 30.

As a typical field of use for the valve 10, I cite the control of a gas-burning refrigerator, in which the temperature of the refrigerator compartment is a function of the rate of gas combustion. On a typical setting dial for a valve employed in such service, see Fig. 4, the markings 1 through 6 represent a range of refrigeration temperatures, setting #6 providing the lowest temperature and hence the maximum rate of gas combustion. "Defrost" represents the minimum gas flame with a refrigerator temperature too high for the preservation of perishable foods; #0 setting represents a rate of gas combustion greater, and a refrigerator temperature lower, than that at "defrost."

The pitch and length of valve-setting screw 17 and the relationship of valve cap 31 thereto, are such that at the #1 dial setting the end of valve stem 35 is brought into operative position with respect to bellows 30; if the refrigerator temperature is lower than that represented by the #1 setting, the bellows will be in a collapsed state and valve disc 36 will remain on its seat. An expansion of bellows 30 under the influence of rising refrigerator temperatures, will bring the center of the bellows surface into contact with the valve stem 35, and continued expansion will urge the stem upwardly, raising the disc 36 from its seat. Gas will then flow from chamber 14 through aperture 38, downwardly along channelled valve stem 35 into outlet chamber 16, whence it flows through outlet connection 27 to the burner.

During periods when valve disc 36 is in closed position flow of gas to the burner in sufficient quantity to keep the burner lighted at a minimum flame condition is afforded through a port 40 in inlet chamber ring 20, through a passage 41 in registry therewith, and finally through passage 42 into outlet chamber 16, whence it passes through connection 27 to the burner.

This latter condition of gas flow prevails when the valve setting screw is at the "defrost" dial setting, in which position the relationship of valve 29 and stem 35 to the bellows 30 is as shown in Fig. 2.

An adjustment screw 43 may be employed to establish the desired volume of flow through passages 41, 42. The shank of said screw may terminate in a frusto-conical tip, providing for a relatively fine adjustment of flow.

A feature of the valve 10 resides in the provision of secondary valve means whereby the continuous flow of gas through passages 41, 42, may be supplemented independently of operation of valve 29. Such supplemental gas flow affords a refrigerator temperature lower than "defrost" but higher than the operating food preservation temperature. Such temperature condition may be advantageous during vacation periods, when the housewife wishes to keep the refrigerator reasonably cold during her absence, but not within the usual range of food preservation temperatures.

This phase of valve operation may be attained by means comprising a valve 45, see Fig. 3, normally held against its seat 46 by a spring 47, and a lever 48 pivotally mounted within outlet chamber 16.

Gas flow to the valve 45 is through an aperture 52 formed in ring 20, then through passages 53, 54, to the spring chamber 55 beneath valve 45. A screw 56 arranged at the terminus of passage 53 affords regulation of quantity of gas flow.

Secondary flow control lever 48 is advantageously stamped from sheet metal, preferably stainless steel. The upstanding side walls are arcuately configurated intermediate the ends of the lever to form bearing surfaces 60, 60, for operative association with base 33 of valve 29, as presently described. In the zone of such bearings, an aperture 61 is provided to permit the unrestricted passage of valve stem 35. Ears 62 of lever 48 are pierced to receive a suitable shaft.

As appears from Figs. 1 and 3, lever 48 is pivotally mounted within outlet chamber 16, with the bearing surfaces 60, 60, disposed beneath the base 33 of valve 29. Valve stem 35 extends through the aperture 61 of lever 48. The terminus of lever 48 projects into a chamber 64 formed in valve body base 11, and in such chamber, rests upon the end of valve stem 50.

For pivotally mounting the lever 48, the metallic gasket 21 may advantageously be used. Accordingly, said gasket, see Figs. 5 and 6, is formed with pierced ears 21a, 21b, which are struck downwardly to form spaced bearing means between which the lugs 62, 62, of lever 48 are loosely confined by any suitable shaft means.

With the valve setting at the "defrost" position, see Fig. 2, valve 29 is so positioned with respect to bellows 30 and lever 48 that the valve stem 35 is out of engagement with bellows 30, and no pressure is exerted by base 33 against the bearings 60 of lever 48. In such position, valves 36 and 45 are closed, each under the urging of its respective spring, and gas flows to outlet 27 only through passages 41, 42.

Upon turning the setting screw 17 to the right, the chamber 14 and its therewith carried valve 29 are moved downwardly. Lever 48 is moved counterclockwise of Fig. 3 by the pressure of base 33 thereagainst, and the resultant downward movement of valve stem 50 and valve 45 permits flow of gas from chamber 14, through passages 53, 54, upwardly along channeled valve stem 50 into outlet chamber 16. If the refrigerator were sufficiently cold at the time of the stated setting of screw 17, the collapsed status of the bellows 30 would not occasion an upward movement of valve stem 35. If, however, the bellows 30 were in expanded position, the stem would come into contact with bellows 30 and be raised thereby, thus causing gas flow through valve 29.

It will be understood that the total movement of the valve 29 is relatively small, inasmuch as it takes place within less than one revolution of the setting screw 17. The lever 48 magnifies the displacement of the valve 29 as respects the operation of secondary flow valve 45 and accomplishes the desired operation of such valve within a small fraction of the total permitted movement of the adjusting screw 17.

Fig. 8 shows a second form of gas flow adjustment screw for the control of gas flow through the passages 41, 42, or passages 53, 54. According to this embodiment, the screw, designated 43a, is provided with a shank of which the terminus is in the form of a truncated cylinder, rather than a frusto-cone. As is obvious, the frusto-conical terminus of the screw of Fig. 3 provides an annular flow opening, the area of which is determined by the relationship of the tip to the wall of the chamber 41a. In contrast, the terminus of the Fig. 8 screw 43a serves to restrict the opening of the passage 41, increasing the velocity of flow through the opening, and causing the fluid to impinge against the sloping end surface of the screw for deflection downwardly.

All fluids, and particularly illuminating gas, may contain foreign particles or gum-producing matter. In the screw formation of Fig. 3, the frusto-conical tip permits the fluid to envelop the tip, and affords increased opportunity for the entrapment of dirt or the formation of gum deposit in the relatively small annular space. In the Figure 8 embodiment, however, the fluid does not surround the shank of the screw, and the high velocity of impact of the fluid against the sloping surface minimizes the opportunity for gum deposit or entrapment of dirt within the orifice.

Having now described and illustrated one form of my invention, I wish it to be understood that my invention is not to be limited to the specific form or arrangement of parts herein described and shown, except in so far as such limitations are specified in the appended claims.

I claim as my invention:

1. A valve comprising, in combination, a body; a cylindrical inlet chamber disposed therein and subdividing the same to provide an outlet chamber concentric with said inlet chamber, said inlet chamber including an upper and lower flexible diaphragm maintained in spaced parallel relationship; valve means disposed within said chamber concentric therewith and affording controlled flow of fluid from said inlet chamber to said outlet chamber, said valve means including a cap and a base respectively securing the valve means to the upper and lower diaphragms; valve actuator means disposed in operative relationship to said valve means; adjustment screw means operatively associated with said valve cap to displace the valve means as a unit with respect to said valve actuator; means by-passing said first-mentioned valve means to provide a second path of flow from said inlet chamber to said outlet chamber; valve means in said by-pass means; and means operative upon displacement of said first-mentioned valve means to actuate the said by-pass valve means.

2. A valve comprising, in combination, a body; an inlet chamber disposed within said body and dividing the same to provide an outlet chamber concentric with said inlet chamber, said inlet chamber comprising a pair of spaced flexible diaphragms and spacer ring means for maintaining said diaphragms in spaced mutually parallel relationship; valve means disposed within said chamber concentric therewith, said valve means including cap means and base means secured respectively to said upper and lower diaphragms; valve actuator means arranged within said outlet chamber and including an expansion element arranged concentrically within said chamber in operative association with said valve means; and adjustment screw means operatively associated with said valve cap means to displace said valve means with respect to said valve actuator means.

3. A valve comprising, in combination, a body; a fluid inlet chamber arranged therein, said inlet chamber comprising a plurality of flexible diaphragms arranged in spaced mutually parallel relationship and secured within said body in fluid-tight relationship therewith; an outlet chamber; valve means affording controlled flow of fluid from said inlet to said outlet chamber, said valve means being disposed within said inlet chamber concentrically therewith and secured to the said diaphragms; valve actuator means including an expansion element arranged within said outlet chamber and operatively associated with said valve means; and adjustment screw means arranged to flex the diaphragms comprising the inlet chamber to move the valve means in a path axial of and normal to the said diaphragms to adjust the position of said valve means with respect to said actuator means.

4. A valve comprising, in combination, a fluid inlet chamber disposed within a housing and comprising a plurality of flexible diaphragms arranged in spaced mutually parallel relationship; an outlet chamber disposed within said housing; valve means for controlling flow from said inlet chamber to said outlet chamber, said valve means being centered within said inlet chamber and secured thereto by engagement with the diaphragms thereof; valve actuator means including an element disposed within said outlet chamber and operatively associated with said valve means, said valve actuator element being movable with respect to said valve means in response to conditions externally of said valve; and means effective to flex the diaphragms of said inlet chamber to move the valve means in one or another direction with respect to said valve actuator means.

5. A valve according to claim 1, in which said by-pass valve actuator means comprises a pivoted lever engageable with the base of said first-mentioned valve and in operative association with said by-pass valve means.

6. A valve comprising, in combination, a body, flexible diaphragm means mounted therein in fluid-tight relationship therewith to provide a plurality of chambers, valve means supported by said diaphragm means for displacement within said body upon flexing said diaphragm means, said valve means affording flow from one to another of said chambers, valve actuator means including an expansion bellows disposed within one of said chambers in operative association with said valve means, and diaphragm adjustment means accessible externally of said body to flex said diaphragm means and move said valve means relatively to said valve actuator means.

7. In a valve, a pair of chambers, a valve body carried by an element of one chamber and movable bodily with respect to said other chamber, said valve body having an orifice providing a path of communication between said chambers, a valve disc associated with said orifice, means for moving said valve disc with respect to said orifice to control flow therethrough, a second path of communication between said chambers, valve means in said second path, means operatively associating said valve body and said valve means for actuating said valve means upon movement of said valve body to control flow through said second path of communication, and means accessible externally of said chambers for effecting movement of said valve body.

8. A valve, comprising in combination, a body, a fluid inlet chamber secured within said body, said chamber including at least one flexible diaphragm; valve means secured to said diaphragm within said chamber constructed and arranged to control flow therethrough, said valve means including a valve disc and therewith associated axially movable valve stem; expansion means disposed externally of said chamber in direct operative relationship with said valve stem to actuate the same so as to move the valve disc relatively to the remainder of the valve means to effect flow therethrough; and means for adjusting the position of said valve means with respect to said actuator by flexing the diaphragm of said fluid inlet chamber.

9. A valve comprising, in combination, a hollow body, an outlet therefrom, a hollow structure disposed within said body to provide a chamber therein, one wall of said hollow structure comprising a flexible diaphragm, valve means disposed within said hollow structure and supported by said flexible diaphragm for movement therewith, said valve affording means of controllable communication between said chamber and said body; means for operating said valve means in a manner to control said communication; inlet means to said chamber; means for flexing said diaphragm to effect bodily movement of said valve means with respect to said operating means; a by-pass connecting said chamber and said body; valve means in said by-pass, and means responsive to the movement of said first-named valve to operate said by-pass valve means to control flow between said chamber and said body.

10. A valve according to claim 9, further characterised by the disposition of the by-pass valve means remote from the diaphragm-supported valve means, and operatively associated therewith by a lever actuated by movement of said diaphragm supported valve means.

11. In a valve, a pair of chambers, a valve body carried by an element of one chamber and movable bodily with respect to the other, said valve body providing a passage between said chambers, valve means within said body for controlling flow through said passage, means adapted to move into or out of engagement with said valve means to operate the same, means for moving said valve body and therein contained valve means toward or away from said valve operating means to establish a desired extent of movement of said operating means before engagement thereof with said valve means, a second passage connecting said chambers, valve means in said second passage to control flow therethrough, and valve actuator means for said second valve operatively associated with said valve body so arranged that movement of said valve body toward said valve operator means opens said second named valve and movement in an opposite direction effects closure of said valve.

WILLIAM K. MATHESON.